United States Patent
Fernandez et al.

(12) 
(10) Patent No.: US 7,165,489 B1
(45) Date of Patent: Jan. 23, 2007

(54) COOKING VESSEL

(75) Inventors: Juan Fernandez, Towaco, NJ (US); Anthony Notaro, Las Vegas, NV (US)

(73) Assignee: Products of Tomorrow, Inc., Towaco, NJ (US)

( * ) Notice: Subject to any disclaimer, the term of this patent is extended or adjusted under 35 U.S.C. 154(b) by 0 days.

(21) Appl. No.: 10/643,329

(22) Filed: Aug. 19, 2003

Related U.S. Application Data

(60) Provisional application No. 60/405,986, filed on Aug. 26, 2002.

(51) Int. Cl.
*A47J 37/10* (2006.01)
*A47J 27/02* (2006.01)
*A45C 3/00* (2006.01)

(52) U.S. Cl. ............... 99/422; 99/340; 126/390.1; 126/373.1; 220/573.1; 220/912; 16/425; 16/110.1; 16/422

(58) Field of Classification Search ............... 99/422, 99/340, 403, 449; 16/111.1, 422, 425, 110.1; 220/759, 770, 752; 126/390.1, 373.1
See application file for complete search history.

(56) References Cited

U.S. PATENT DOCUMENTS

| | | | |
|---|---|---|---|
| 2,368,297 A * | 1/1945 | Hanke | 220/759 |
| 2,370,860 A * | 3/1945 | Hanke | 16/425 |
| 2,712,151 A | 7/1955 | Becht | |
| 3,010,688 A | 11/1961 | Serio | |
| 3,203,029 A | 8/1965 | Serio | |
| 3,232,657 A | 2/1966 | Thompson et al. | |
| 3,422,485 A | 1/1969 | Pryce | |
| 3,798,706 A | 3/1974 | Wolfson et al. | |
| 3,981,233 A | 9/1976 | Nugarus | |
| 4,206,853 A | 6/1980 | Iten et al. | |
| 4,577,367 A | 3/1986 | Durand | |
| 4,653,468 A * | 3/1987 | Lemme et al. | 126/373.1 |
| 4,666,727 A * | 5/1987 | Wang | 426/523 |
| 4,763,567 A * | 8/1988 | Dalquist et al. | 99/323.5 |
| 4,794,666 A | 1/1989 | Kim | |
| 4,825,505 A | 5/1989 | Witte | |
| 5,373,608 A | 12/1994 | Welch | |
| 5,511,466 A | 4/1996 | Dzibinski | |
| 5,704,092 A | 1/1998 | Nicollet et al. | |
| 5,771,783 A | 6/1998 | Uss | |
| 5,887,751 A | 3/1999 | Kroscher | |
| 6,000,100 A | 12/1999 | Montgelard | |
| 6,079,590 A | 6/2000 | Munari | |
| 6,105,810 A | 8/2000 | Daenen et al. | |
| 6,202,875 B1 | 3/2001 | Chang | |
| 6,250,493 B1 | 6/2001 | Kwan | |

(Continued)

OTHER PUBLICATIONS http://ww.smaillislandtrader.com (3 pages), date unknown.

(Continued)

*Primary Examiner*—Reginald L. Alexander
(74) *Attorney, Agent, or Firm*—Lerner, David, Littenberg, Krumholz & Mentlik, LLP

(57) ABSTRACT

A cooking vessel is disclosed having a main cooking surface. In one aspect, the cooking vessel has an exchangeable handle, one of the handles being elongate. In another aspect, a textured cooking surface is provided on an interior the cooking vessel to retain food on the textured portion at a level different from the main cooking surface.

14 Claims, 12 Drawing Sheets

U.S. PATENT DOCUMENTS

| | | |
|---|---|---|
| 6,257,439 B1 | 7/2001 | Hsu |
| 6,260,733 B1 * | 7/2001 | Eimerman ................. 220/759 |
| 6,273,285 B1 | 8/2001 | Chang |
| 6,279,771 B1 | 8/2001 | Bryant |
| 6,341,714 B1 | 1/2002 | Bogani |
| 6,360,654 B1 | 3/2002 | Cornfield |
| 6,390,014 B1 | 5/2002 | Ghidini |
| 6,393,973 B1 | 5/2002 | Velo et al. |
| 6,694,868 B1 * | 2/2004 | Hung .......................... 99/403 |
| 6,698,064 B1 * | 3/2004 | Graj et al. .................... 16/430 |

OTHER PUBLICATIONS http://www.crister.fr (1 page), date unknown.
http://www.meilleurduchef.com (2 pages), date unknown.
http://www.americadeals.com, (1 page), date unknown.
http://ingenio.t-fal.com (2 pages), date unknown.

* cited by examiner

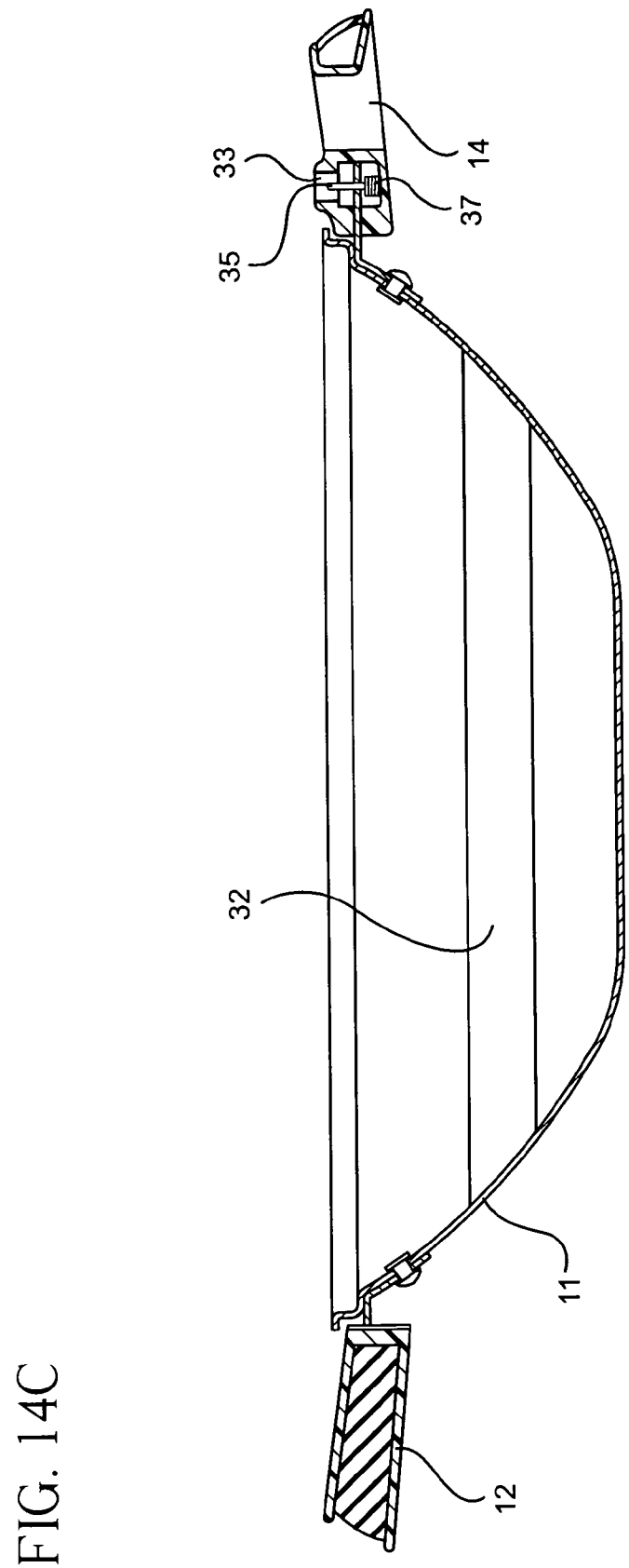

COOKING VESSEL

CROSS-REFERENCE TO RELATED APPLICATIONS

This application claims the benefit of Provisional Application No. 60/405,986 that was filed on Aug. 26, 2002, the teachings of which are incorporated herein by reference.

BACKGROUND OF THE INVENTION

The present invention relates to cookware that can be used for food preparation and service. More particularly, the present invention relates to a wok that features an exchangeable handle, an integral food retention section, and a whistle.

As is well known, a cooking wok is generally in the form of a bowl-like utensil in which foods are rapidly cooked while being stirred. Wok cooking typically entails shaking and/or shifting the food ingredients in the wok during cooking. The basic techniques of wok cooking include stir-frying, deep-frying and steaming. A chef utilizes a handle on the wok to facilitate the wok style of cooking more so than in other styles of cooking.

Traditional woks may include grates or trays arranged around the outer perimeter to drain fried foods, and to maintain food temperature prior to serving. Wok cooking frequently involves cooking several ingredients together in the primary cooking space while segregating other ingredients that have been previously cooked or which are simply being pre-heated. The chef must shift certain foods to the upper sides of the wok to allow fried foods to drain or to slow the cooking of certain foods while cooking other foods or ingredients. In this manner, all ingredients of a dish may be cooked to the appropriate level. This is particularly important in cooking vegetables, which can overcook to be soft instead of firm.

Additionally, a chef must know when certain conditions have been reached when working with a covered wok. Such conditions include boiling and steaming.

SUMMARY OF THE INVENTION

The present invention overcomes the various shortcomings associated with prior woks. In particular, the present invention provides an attractive cooking vessel that is well suited to wok cooking.

In one aspect of the invention, a cooking vessel is disclosed that includes exchangeable handles to facilitate stovetop cooking and tabletop serving. The cooking handle provides a good grip for grasping the wok during stir-frying. When cooking is completed, the serving handle can be exchanged for a more traditional casserole style handle for tabletop service.

Another aspect of the present invention provides a means for retaining and separating foods during cooking. The cooking vessel includes a section in the base of the cooking vessel that retains food. In one embodiment, the section may be dimpled or textured to create additional friction. The present invention thus includes an integral food retention section that allows deep-fried foods to drain or to allow other foods to cook while slowing the cooking of the food retained in the food retention section. The food retention section of the present invention thus prevents segregated foods from slipping back into the primary cooking space.

Another aspect of the present invention provides an audible notification device to alert cooks of internal temperature and pressure within the cooking vessel. The present invention thus provides a whistle on the cover of the wok can alert busy cooks of internal temperature and pressure build-up by releasing hot air, providing both safety and convenience when steaming.

The present invention comprises a cooking vessel for food preparation and service. The cooking vessel further comprises a bowl-shaped base and a cover. The present invention may further include inserts for steaming food ingredients. These inserts may be used in conjunction with the other aspects of the present invention.

An aspect of the present invention provides an apparatus allowing for detachable handles for properly grasping the cooking vessel. The apparatus according to this aspect of the invention includes a handle attachment member residing on the cooking vessel, a handle grip member, an interior handle lock, and a handle release device. The types of handles included may be but are not limited to a long cooking handle for manipulating the cooking vessel during cooking, and a serving handle for carrying the cooking vessel, and its contents, to a dinner table or other serving area. The detachable handles allow the cooking vessel to be more versatile in both cooking and serving.

Another aspect of the present invention provides an apparatus for retaining and separating food above the cooking portion of the vessel base. The apparatus according to this aspect of the invention includes means for preventing food disposed above a point on the vessel sides from sliding down into the cooking portion at the bottom of the vessel. These means may include but are not limited to a rougher surface ring of a higher coefficient of friction displaced above the cooking surface, or an array of dimples, which prevents food from sliding down into the cooking area. These means prevent overcooking of already cooked food pieces, while allowing the vessel to be easier to use.

Another aspect of the present invention provides an apparatus for alerting a user of internal temperature and pressure within the cooking vessel. The apparatus according to this aspect of the invention includes cover for the cooking vessel for use during the steaming of foods. The cover further includes a knob-like handle with a whistle apparatus built into it. The whistle should allow for adjusting of the amount of steam that is permitted to escape from the cooking vessel. The whistle allows the cooking vessel to alert the user of a build up of pressure and/or steam, thereby preventing overcooking or damage to the vessel.

Thus, the present invention is directed to a cooking vessel having at least two interchangeable handles, both of which are attachable to cooking vessel, and one handle is an elongate grip handle used while cooking in the cooking vessel, for shaking and flipping food ingredients in the cooking vessel while cooking, and the other handle is a serving handle that does not extend from the cooking vessel as far as the cooking handle and is used to facilitate serving of the cooked dish or carrying the cooking vessel before or after cooking, whereby the cooking handle and the serving handle are attachable and detachable from the same portion of the cooking vessel. Preferably, the cooking vessel includes a predetermined attachment point at which the detachable handles can be attached and detached, and more preferably, a fixed attachment member is provided. Preferably, the cooking vessel also includes a permanent handle that is appropriate to facilitate serving with the serving handle, and is preferably situated opposite the attachment point for the detachable handles.

The present invention is also directed to a cooking vessel having a cooking surface that is inclined from the middle outwardly, and further includes a retention section that provides for greater retention of food ingredients than other sections of the cooking vessel. Preferably, the retention section is made of a dimpled, roughened or otherwise modified surface than other sections of the cooking surface in the cooking vessel to facilitate food retention. Preferably, the food retention section is above the lower portion of the cooking surface in the cooking vessel, i.e., that section which is closest to the heat on which the cooking vessel is placed. The cooking retention section may also be a shelved portion so that food can be laid on the shelf and away from direct heat.

The present invention is also directed to a cooking vessel having a cover with a handle in the cover, the handle including a sound-creating mechanism that does emit a sound upon the heat and pressure being built up within the cooking vessel (to indicate boiling and steaming). Preferably, the sound emitting device includes a lever for removing the sound emitting feature. Preferably, the sound emitting feature provides for a whistle sound to be emitted.

Each of the above features of the present invention may also be combined with a steaming basket that can be disposed between the cooking vessel and the cover for the cooking vessel.

In yet another aspect of the present invention, it is directed to a cooking vessel that includes each of the above features in various combinations. For instance, the detachable handles may be combined with the food retention section feature.

The present invention is also directed to methods of cooking in connection with which the above described features are implemented. For instance, a method of cooking includes placing the elongate cooking handle on a cooking vessel opposite to a permanent handle, cooking food ingredients, detaching the elongate cooking handle, attaching a serving handle opposite the permanent handle and which is substantially similar to the serving handle.

In connection with another aspect of the present invention, the handle, i.e. an elongate handle for cooking has a grip akin to a pistol grip such that the portion of the handle around which the hand is placed has a longitudinal axis that extends above the wok bowl, the angle being measured from the bottom of the wok bowl or a horizontal surface such as a cooking surface, and such that the orientation of the hand with respect to the wok bowl and in particular the bottom of the wok bowl enables a cook to make quick movements with his hand and arm in order to facilitate the movement of food within the wok bowl, such as flipping a piece of food or many pieces of food during stir fry action. This feature may be employed with a standard pan or any other pan other than a wok.

BRIEF DESCRIPTION OF THE DRAWINGS

FIG. 14C is a cross-sectional side view of the wok base shown FIG. 11 to illustrate the location of the pattern on the annular portion of the wok;

DETAILED DESCRIPTION OF THE INVENTION

A cooking vessel in accordance with a preferred embodiment of the present invention is generally designated 10 in FIGS. 1–11. Like numbers refer to like elements throughout.

Figure 1:
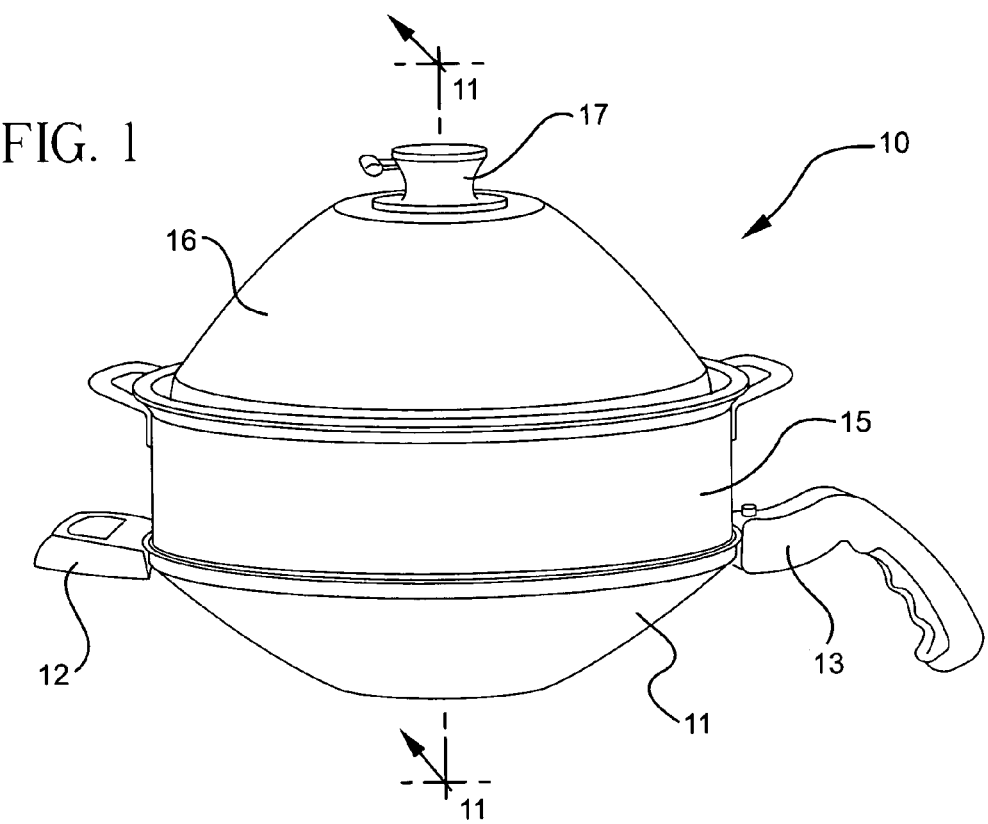
FIG. 1 is a perspective view of a preferred embodiment of the invention showing a cooking handle mounted on the wok, a steamer insert in place, and the serving handle separated from and adjacent to the wok.
Figure 2:
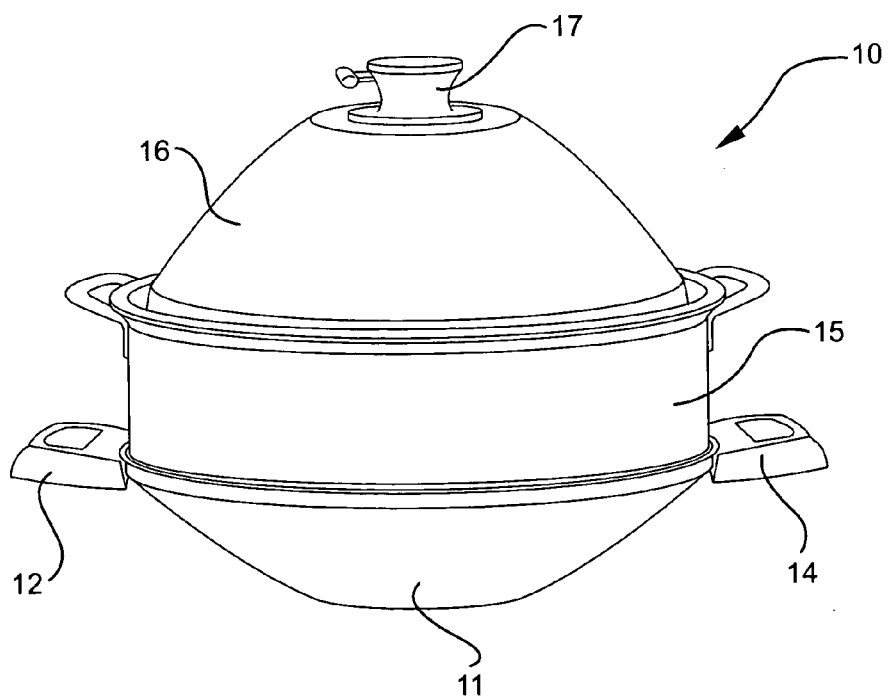
FIG. 2 is a perspective view of a preferred embodiment of the invention showing the serving handle mounted on the wok and the steamer insert in place.

As shown in FIGS. 1 and 2, the cooking vessel 10 includes a cooking vessel base 11, a non-exchangeable or permanent handle 12, a cooking handle 13, a serving handle 14, an optional cooking vessel or steamer insert 15, a cooking vessel lid 16, and a combined whistle and cover handle 17.

Figure 3:
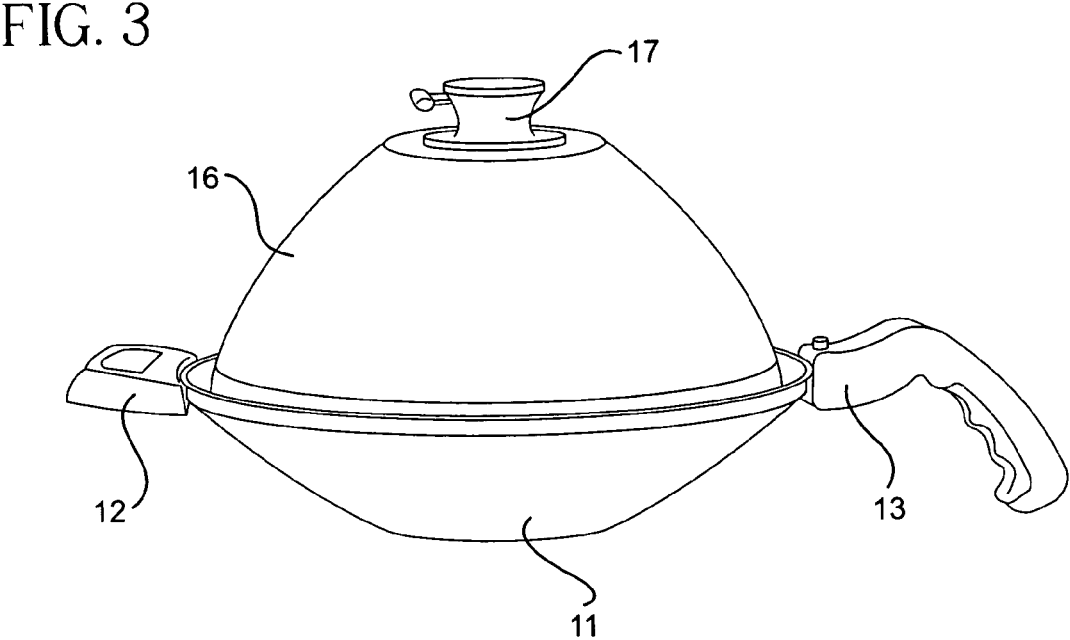
FIG. 3 is a perspective view of a preferred embodiment of the invention showing the cooking handle mounted on the wok and the steamer insert removed from the wok.

In the embodiment shown in FIG. 3, the optional cooking vessel insert or steamer insert 15 is omitted. Cooking handle 13 is installed onto cooking vessel base 11. Cooking vessel lid 16, featuring whistle knob 17 is placed on top of cooking vessel base 11.

Figure 4:
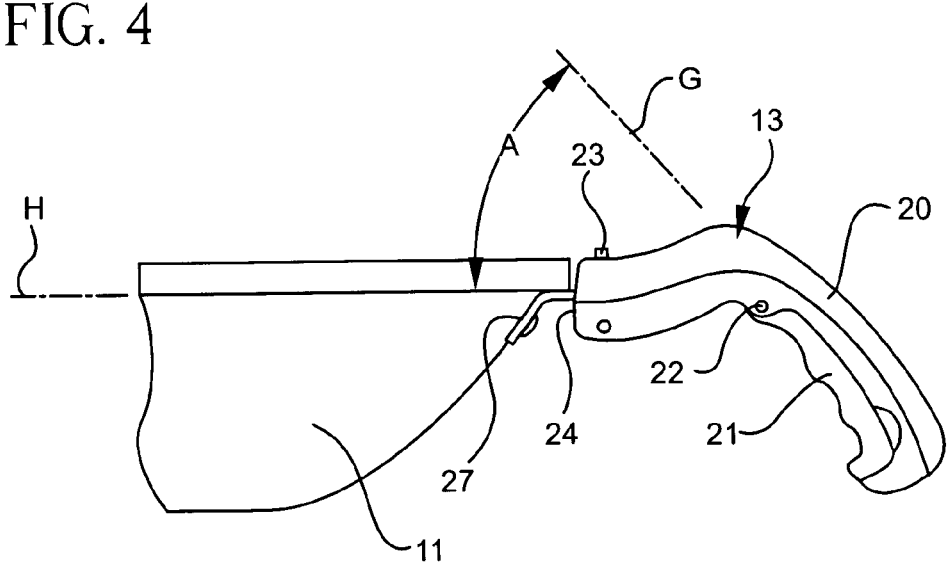
FIG. 4 is a side elevational view showing the cooking handle mounted on the wok, the handle shown in the closed position ready for use.
Figure 5:
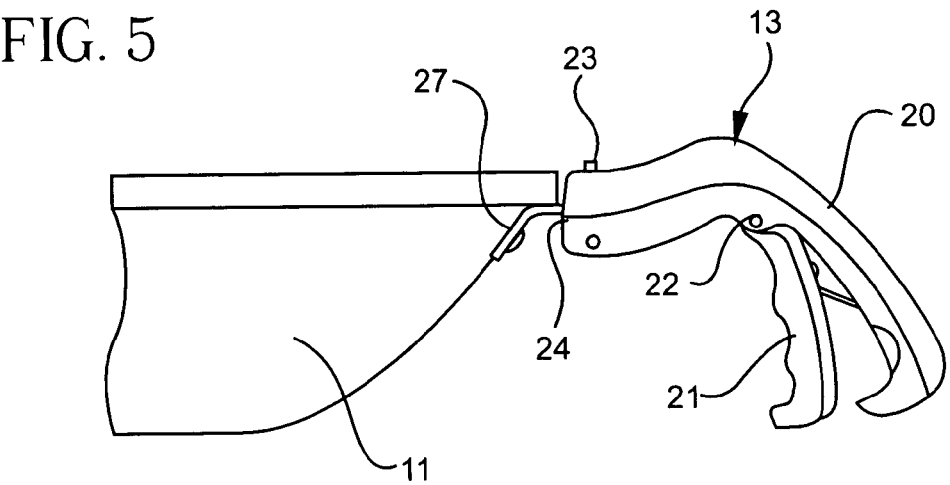
FIG. 5 is a side elevational view showing the cooking handle mounted on the wok, the handle shown in the disengaged or released, position.

FIG. 4 is a detailed side view of cooking handle 13 installed on cooking vessel base 11. In accordance with the preferred embodiment of the cooking vessel 10 shown in FIGS. 3–4, the cooking handle 13 includes an elongated arm 20, a grip device or trigger 21, a pivotal connection 22 for the grip handle, and a release device 23. Grip device or trigger 21 is constructed and arranged for pivotal movement between a disengaged or unlocked position, as shown in FIG. 5 and an engaged or locked position, as shown in FIG. 4. This, in cooperation with release device 23, locks, or unlocks, the handle from the wok. Elongated arm 20 attaches to the cooking vessel base 11 at end 24. End 24 includes an insertion opening 25, such that handle 13 may be attached to cooking vessel base 11.

Figure 6:
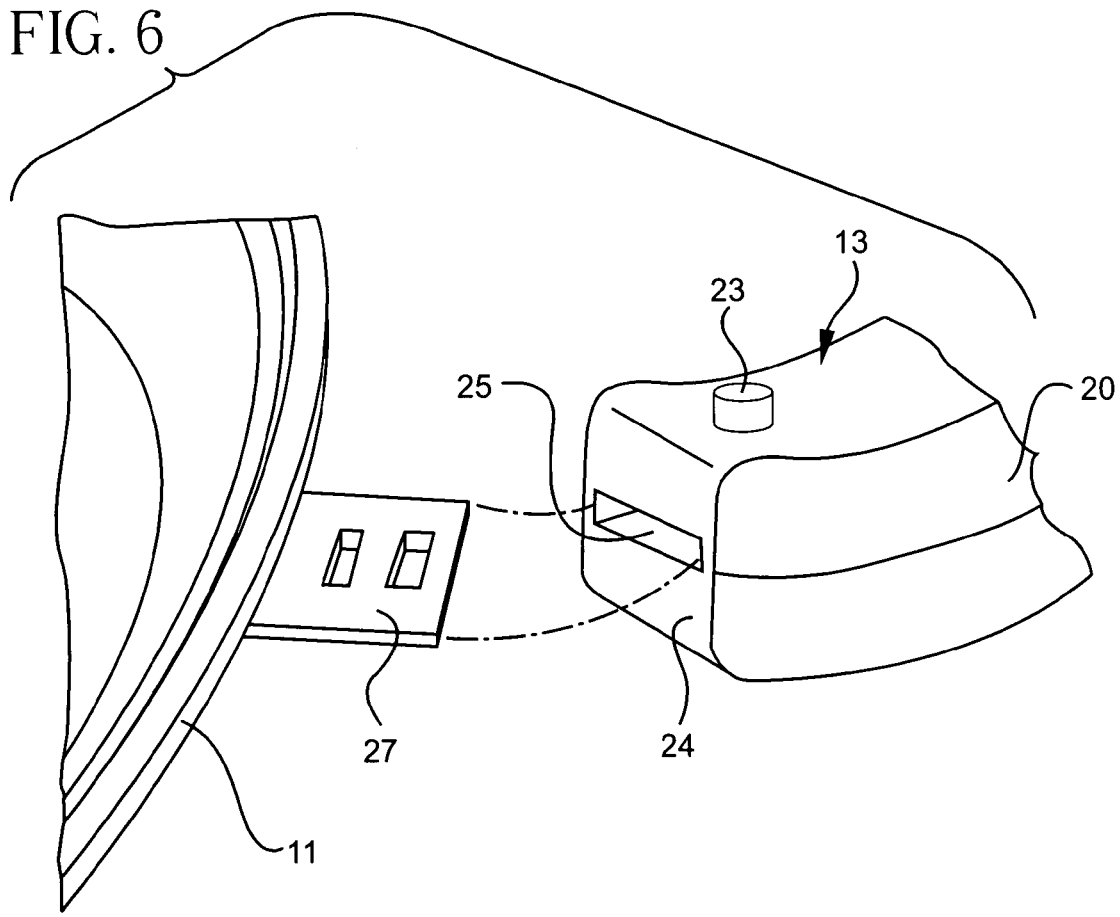
FIG. 6 is a enlarged partial perspective view showing a handle mounting bracket on the wok base with the cooking handle in position to be attached to the bracket.
Figure 7:
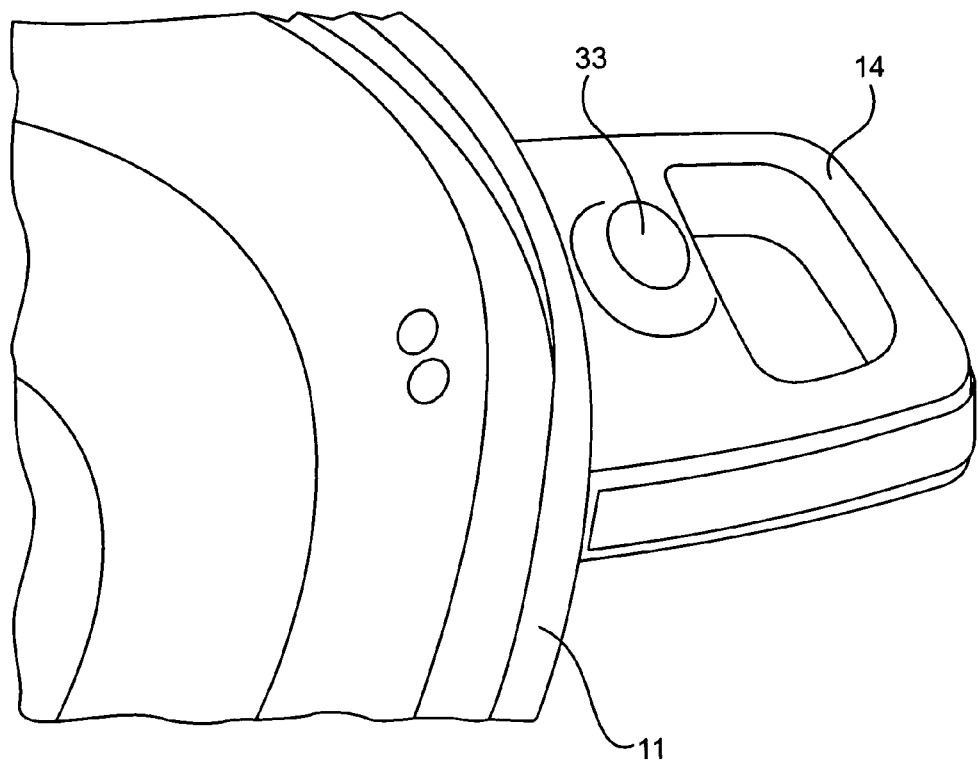
FIG. 7 is a enlarged partial perspective view of showing the serving handle mounted on the wok.
Figure 8:
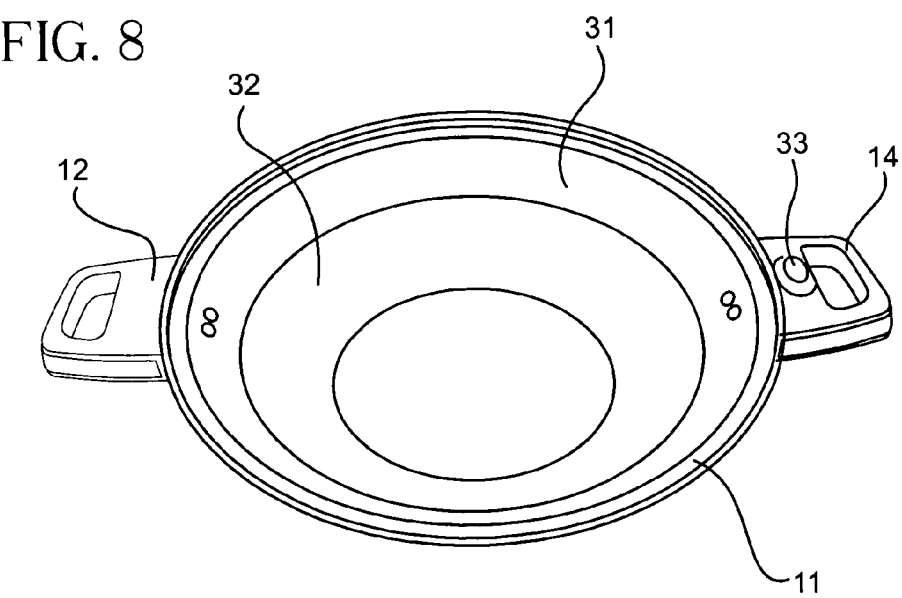
FIG. 8 is perspective view of the interior of the wok showing the food retention section.
Figure 11:
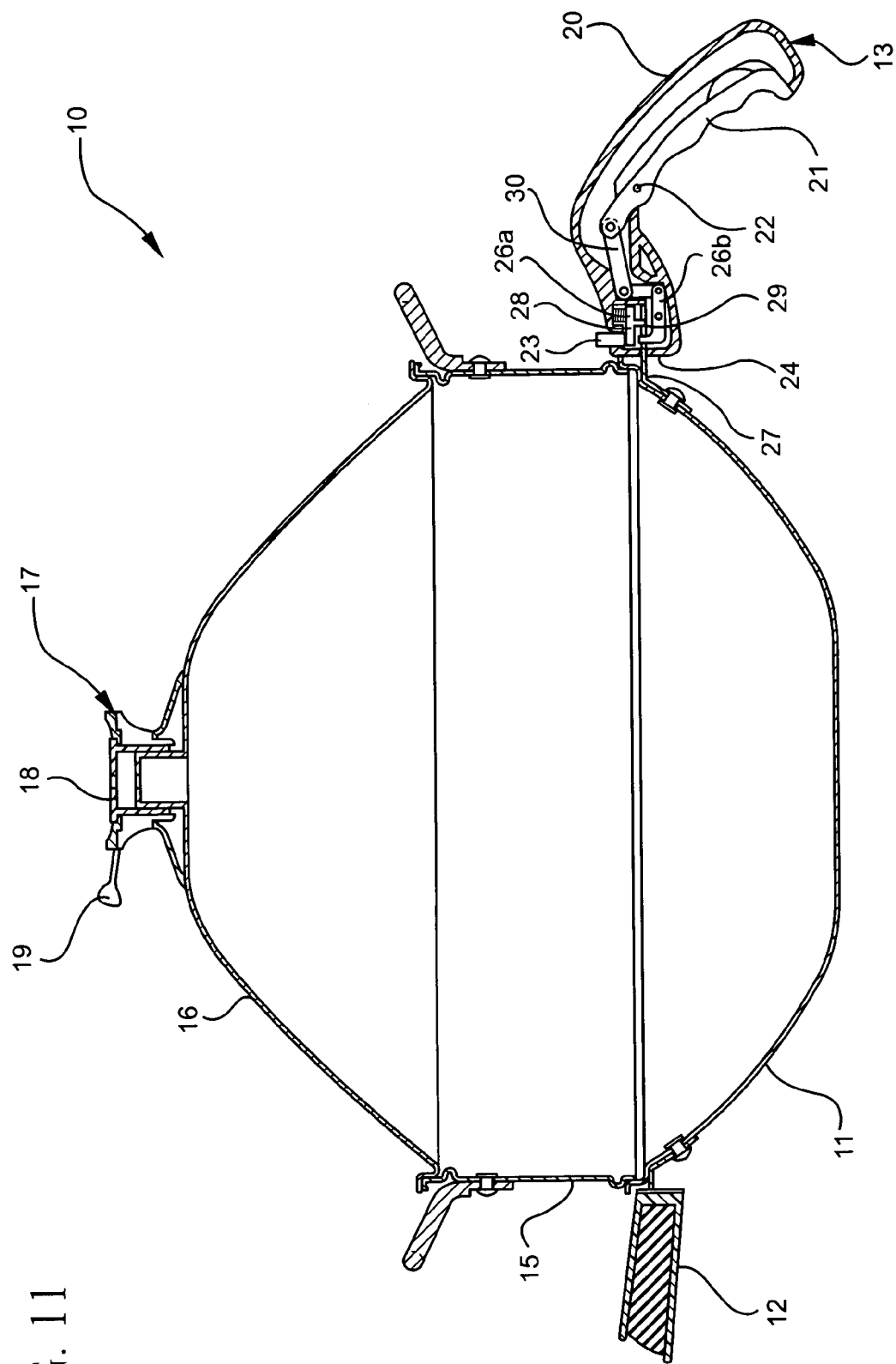
FIG. 11 is a cross-sectional view taken along line 11—11 of FIG. 1.

Cooking handle 13 includes a release device 23 that disengages the first interior handle lock 26a (FIG. 11) from the handle attachment member 27. Handle attachment member 27 is located on cooking vessel base 11, as shown in FIG. 6. The first interior handle lock 26a is designed to securely engage handle attachment member 27 when grip device 21 is engaged. The handle is removed as follows. First the grip device or trigger 21 is moved to an unlocked position as shown in FIG. 5, causing second interior lock device 26b to disengage from the handle attachment member 27. When release device 23 is depressed, first interior handle lock 26a is disengaged from the handle attachment member 27 and handle 13 can be removed from the cooking vessel base 11. To place the handle 13 on the wok, the trigger or grip device 21 is placed in the open position, and the handle is pushed onto the handle attachment member 27. The first interior handle lock 26a will lock onto the attachment member 27 automatically. The trigger or grip device 21 is then placed in the closed position as shown in FIG. 11 so that second interior handle lock 26b engages the handle attachment member 27, securing the handle 13 to the wok. In the normal course of cooking, grip device 21 is compressed thereby ensuring that handle 13 remains safely attached to cooking vessel 10.

Referring to the cooking handle 13, and particularly as is shown in FIGS. 1, 3, 4, 10 and 11, the handle 13 has a specific angle to it in relation to the top edge horizontal surface of the wok bowl or the bottom horizontal surface of the wok bowl. The angle of the handle provides a "pistol grip" arrangement by which a chef's hand is holding the cooking handle at a different angle and orientation than a chef would hold a straight or relatively straight cooking handle. With a straight or relatively straight cooking handle, a chef's hand is placed with the fingers below the handle and the palm on top of the handle. This does not facilitate the cooking action often required, particularly in connection with stir-fry cooking. With the pistol grip-like arrangement, the user is holding the handle as if extending a hand for shaking. This orientation of the hand allows the chef to make quick movements back and forth (along a line generally extending between the handles) in order to move the food or flip food within the wok or other pan on which the handle is provided. Thus, the gripping portion of the cooking handle 13 defines an axis "G" shown in FIG. 11 that is at an angle "A" with respect to and that extends above the cooking surface of the wok. Any comfortable angle "A" may be used, for instance between 30° and 60°, or at approximately 45°, from a horizontal plane "H" shown in FIG. 11 such as a cooking surface. Preferably, the gripping portion of the handle 13 also includes finger rests or indentations for comfort and better gripping. An advantage of this design is that the handle does not protrude as far from the cooking vessel, enabling the cooking vessel to be placed in an oven, thus allowing the cooking vessel to function as a Dutch oven type cooking device. A straight, elongated cooking handle would interfere with the ability to conveniently place the cooking vessel in an oven.

Interior details of cooking handle 13 are disclosed in FIG. 11. First interior handle lock 26a includes lock arm 28 and lock pin 29. When grip handle 21 is engaged, link element 30 causes lock pin 29 to engage the openings of handle attachment member 27. When release device 23 is depressed, lock arm 28 causes lock pin 29 to disengage from handle attachment member 27.

Serving handle 14 may be attached to cooking vessel base 11 by sliding the handle 14 onto the handle attachment member 27, which engages interior handle lock 26. When release device 33 of serving handle 14 is activated, interior handle lock 35 is disengaged, compressing spring 37 and handle 14 can be removed from cooking vessel base 11. To put the serving handle 14 back onto the wok, the release device 33 is depressed and compressing spring 37. The handle 14 is slid onto the handle attachment member 27, and the release device 33 is released. The spring 37 urges the handle lock 35 upwardly and causes the handle 14 to be locked onto the attachment member 27.

In the preferred embodiment of the present invention, the cooking vessel base 11 includes a means for retaining food above the lower portion of the vessel base. During cooking the lower portion of the vessel base is in close contact with a heat source. As food cooks, it is desirable to slow the cooking process while holding the food at a warm serving temperature. When deep-frying food, it is desirable to drain the oil from the cooked food.

As shown in FIGS. 8, 14A–C and 15A–C, base interior 31 includes food retention section 32 which may be textured or dimpled to increase friction thereby improving retention.

Figure 9:
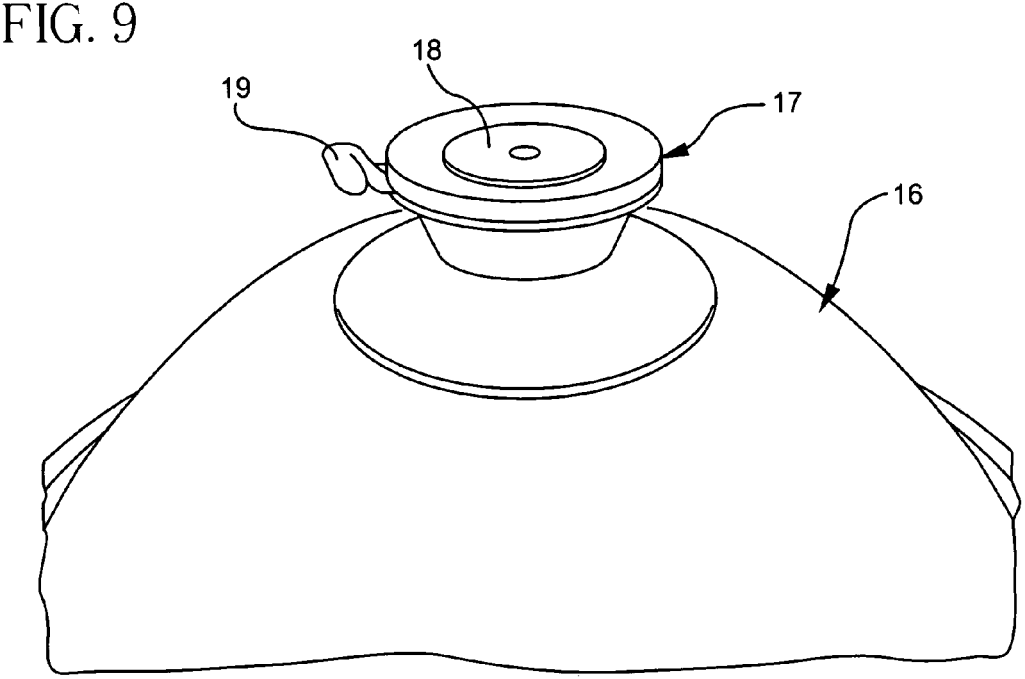
FIG. 9 is a enlarged partial view of a whistle handle.
Figure 10:
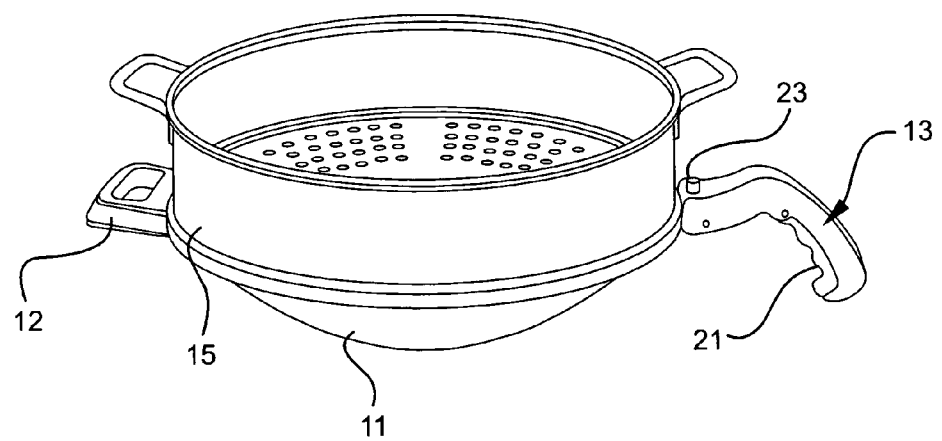
FIG. 10 is a perspective view of the wok with the steamer insert in place and the cover removed.

As shown in FIG. 9, the cooking vessel lid 16 includes a knob 17 on the top for removal and replacement. Integral to knob 17 is an adjustable whistling device. The whistling device includes lever 19 that may be rotated to allow varying amounts of steam to escape from opening 18 during cooking. The escaping steam creates an audible sound, preferably a whistle. When steaming food, the whistle alerts the cook that the liquid in the wok is boiling.

Figure 12:
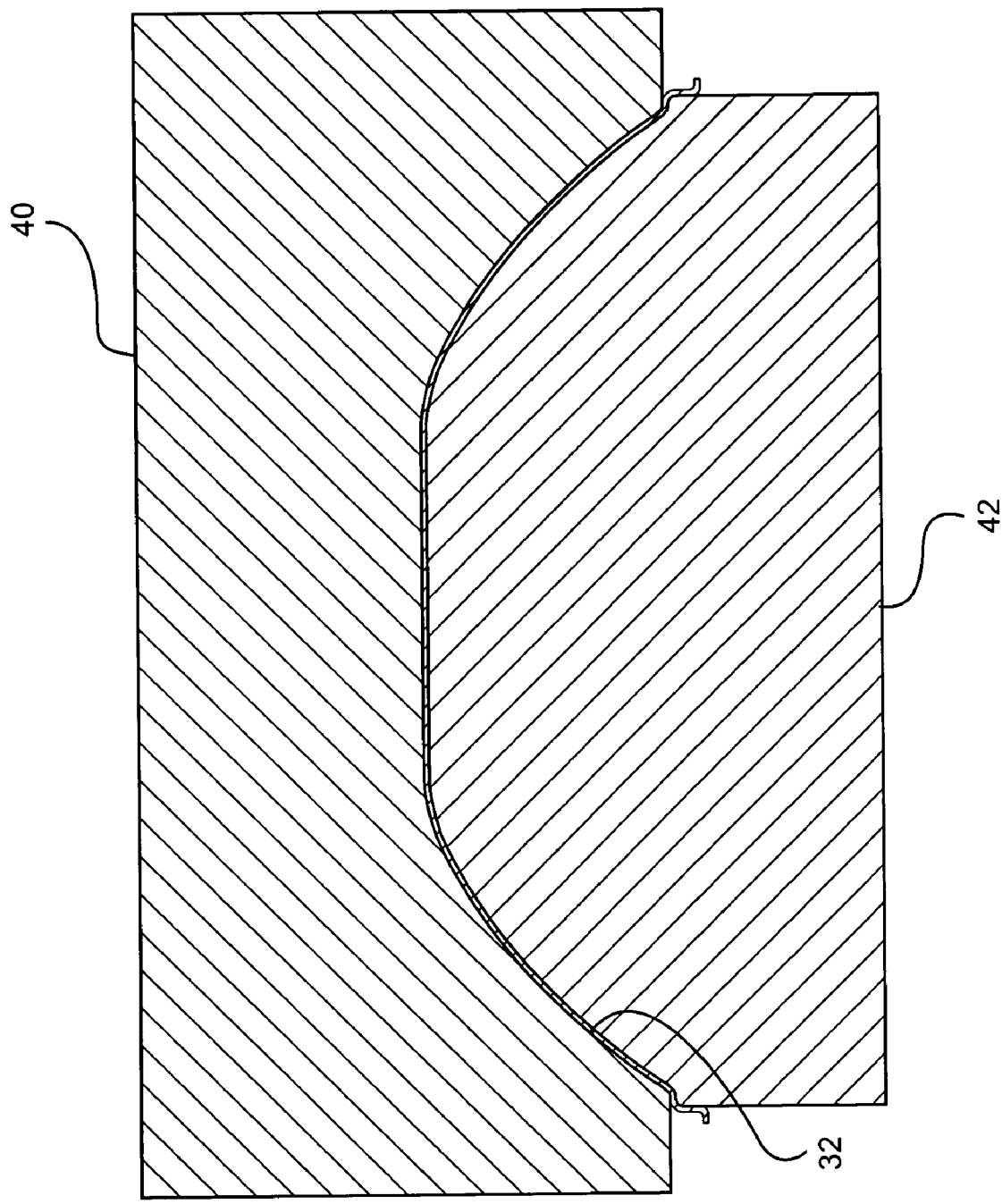
FIG. 12 is a cross-sectional side elevational view of a die and a method used for manufacturing a wok in accordance with one embodiment of the invention, comprising an upper and lower die.
Figure 13:
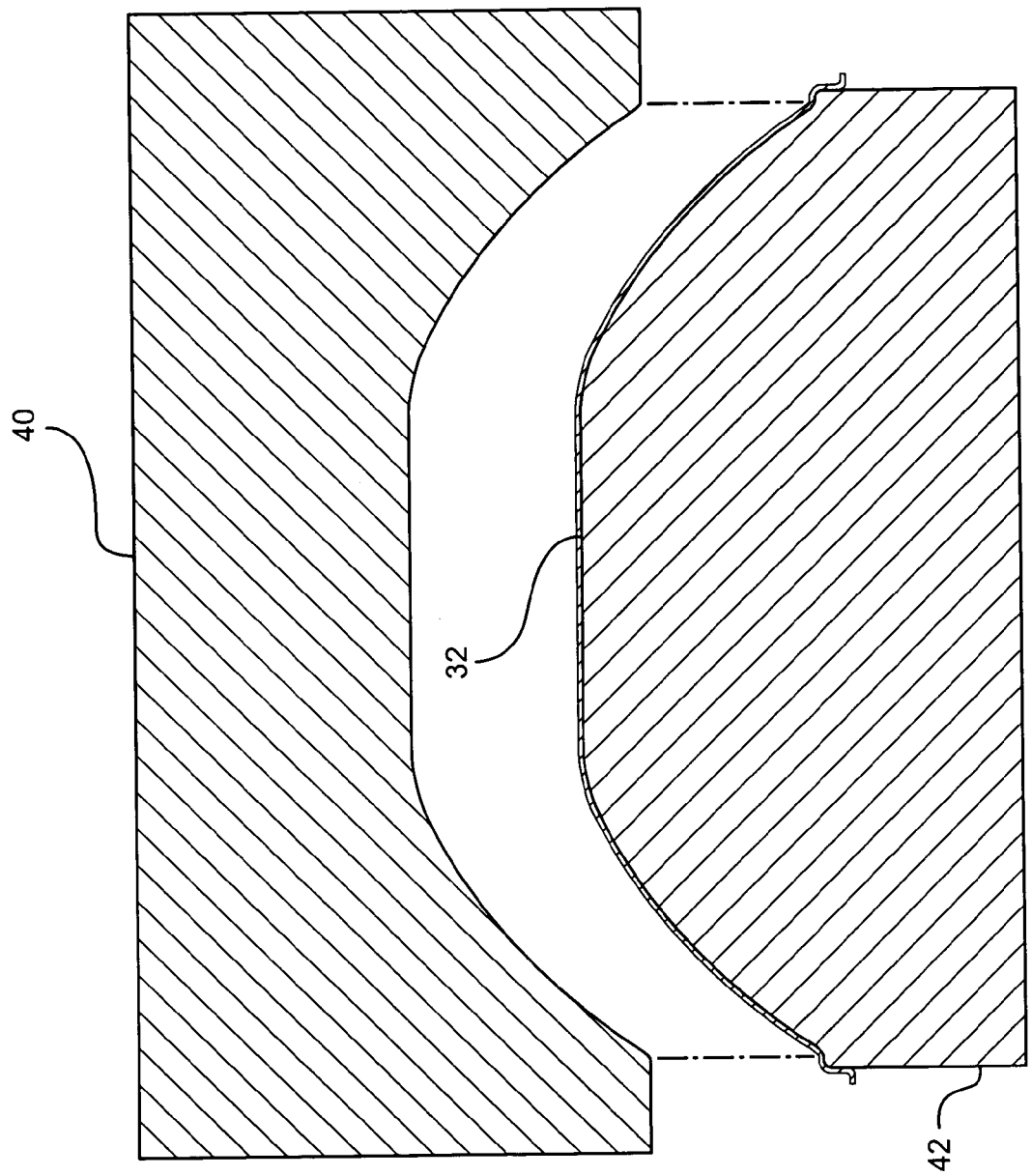
FIG. 13 is a cross-sectional side elevational view of a die similar to FIG. 12, but showing the upper die in an open position.
Figure 14A:
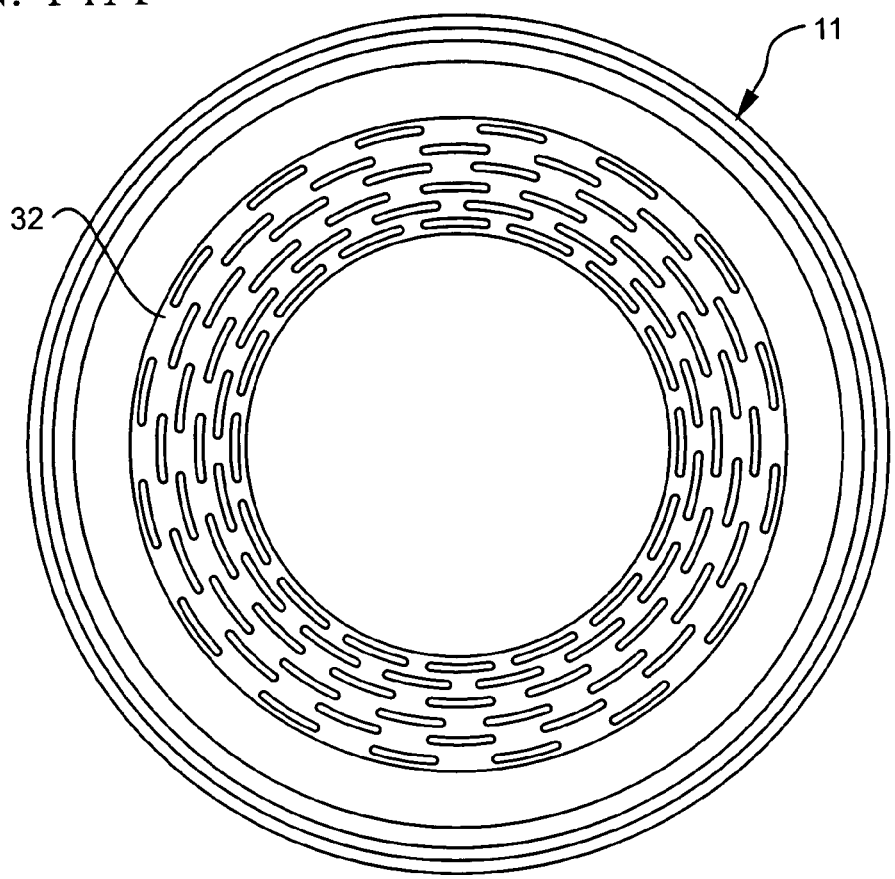
FIG. 14A is a top plan view of a wok showing, in part, a pattern of recesses or projections in an annular ring around the interior of the wok.
Figure 14B:
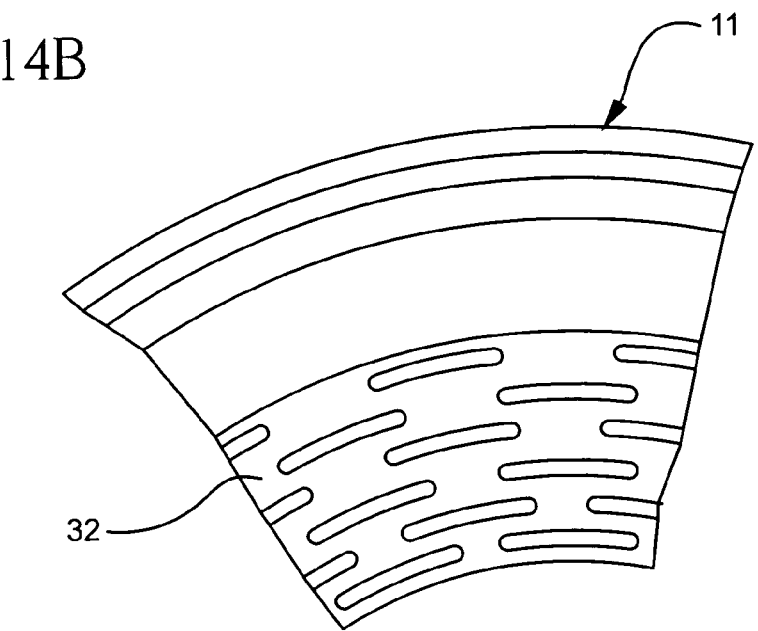
FIG. 14B is an enlarged perspective of the pattern shown in FIG. 14A.
Figure 15A:
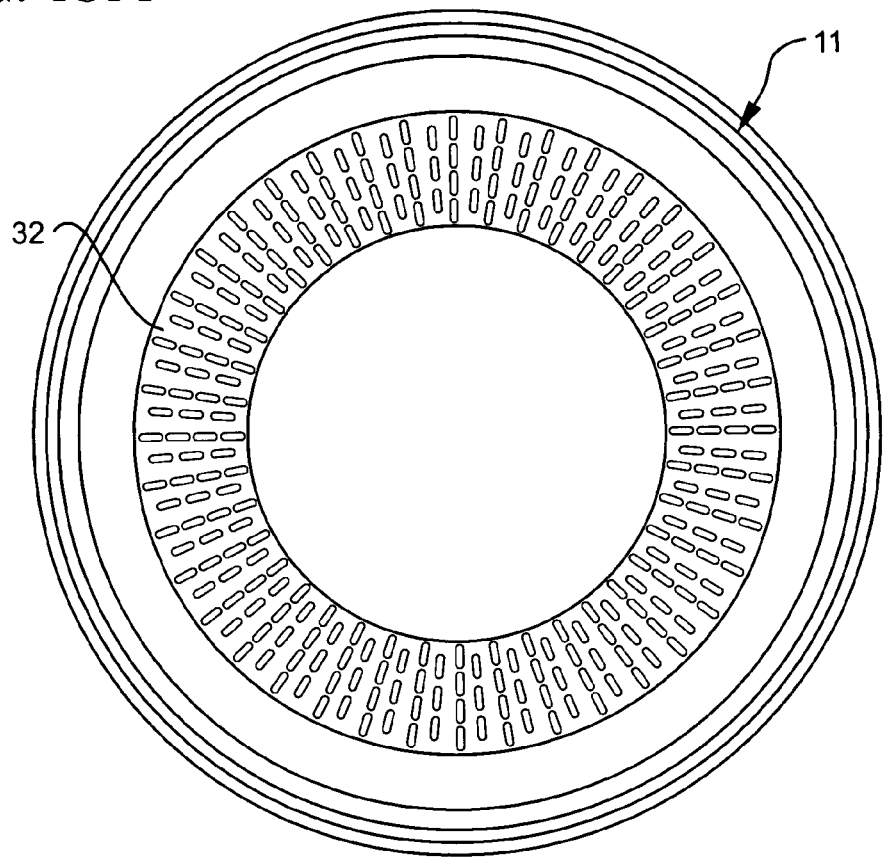
FIG. 15A is a top plan view of a wok revealing, in part, an alternative pattern of recesses or projections in an annular ring around the interior of the wok.
Figure 15B:
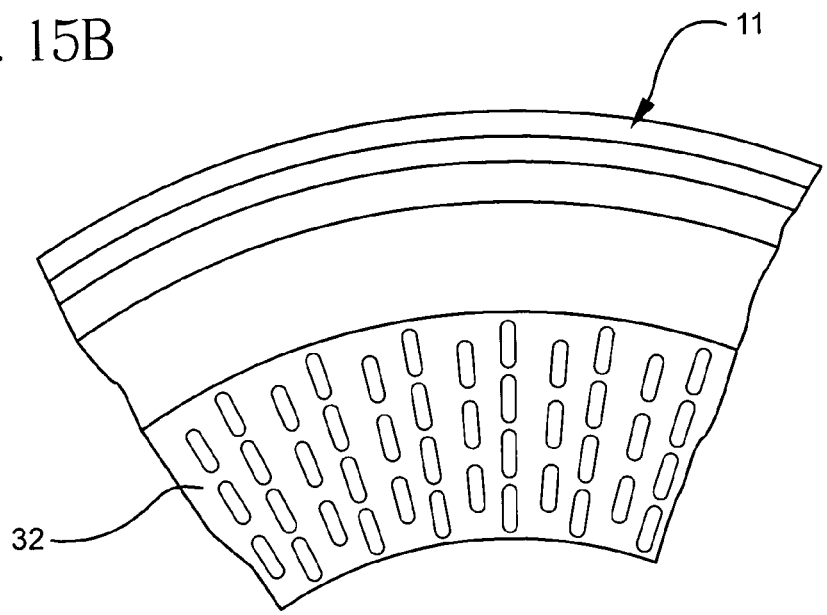
FIG. 15B is an enlarged perspective of the pattern shown in FIG. 15A.
Figure 15C:
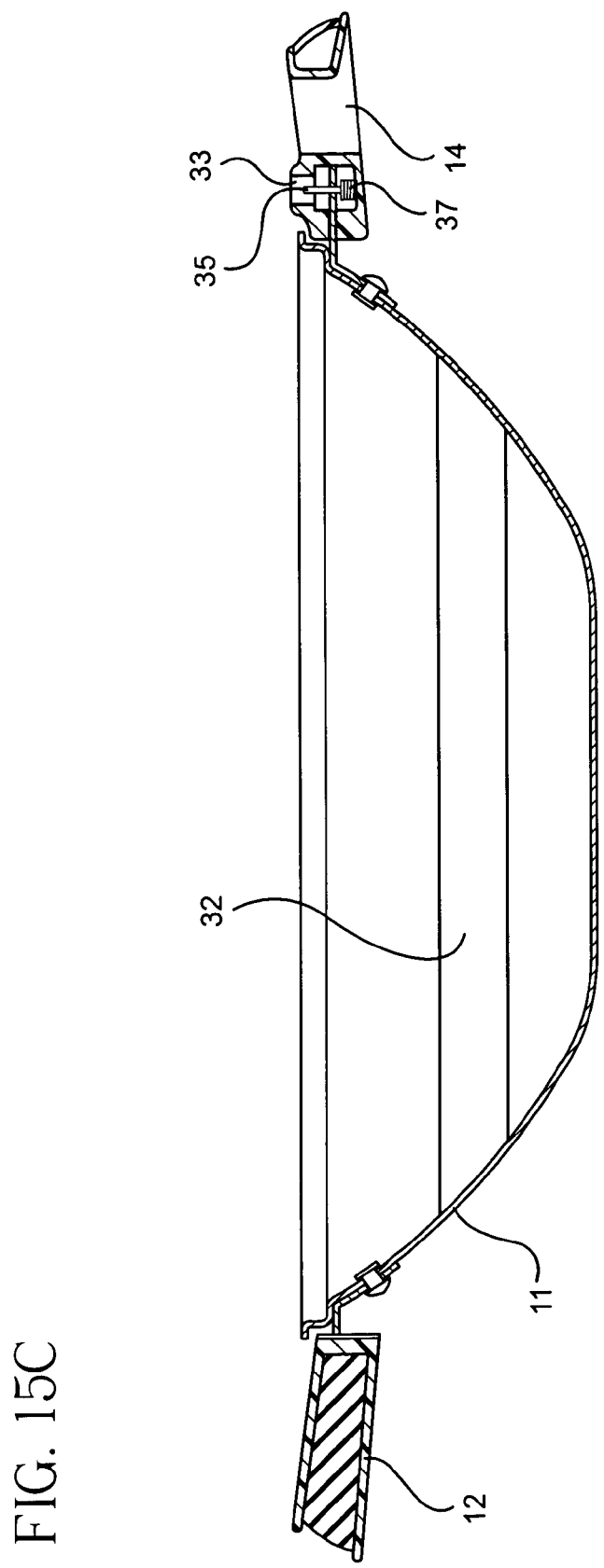
FIG. 15C is a cross-sectional side view of the wok base shown in FIG. 11 to illustrate the location of the pattern on the annular portion of the wok.

Referring to FIGS. 12 and 13, the formation of the wok bowl reveals the use of an upper die 40 and a lower die 42 to form the shape of the wok. Built into either or both of the upper and lower dies 40 and 42 are bosses or raised projections and recesses such that a pattern of grooves are formed into the metal, preferably aluminum, which makes up the wok bowl. The formation of such grooves is illustrated in magnified portions of FIGS. 12 and 13.

As shown in FIGS. 14A–C and 15A–C, preferably, the food retention section 32 is in the form of an annular ring that is provided at some height above the bottom portion of the wok bowl. Within that food retention section 32 is a pattern of recesses or grooves as formed by the upper and lower dies 40 and 42. In one case, the pattern provides elongate grooves that are aligned radially from the center of the interior of the wok. This can be seen in FIGS. 15A–B. The distance and general size and shape of the recesses can be seen in the magnified portion shown in FIG. 15B. In contrast, in FIGS. 14A–B, elongate recesses or grooves are arranged annularly about the center of the wok bowl within the retention areas 32. The size and arrangement and general shape of the recesses or grooves is shown in the magnified portion shown in FIG. 14B. The height of the retention area 32 is shown generally in the side elevational view of the wok as presented in FIGS. 14C and 15C.

Of course, any desirable shape of a recess or groove can be provided within the retention area or any other area. The retention area need not be annular, but rather can be limited to one or two quadrants of the wok bowl. The specific recesses or grooves may also be in the shape of any decorative item, even including cooking utensils or types of food. For instance, the recesses or grooves may be in the shape of vegetables that are typically cooked in a wok. Finally, the recesses or grooves may be formed as projections such that they extend into the cooking area, rather than below the cooking surface. In either instance, the purpose of the recesses or grooves or projections, is to assist in holding food above the lower cooking area that is in the center bottom of the wok bowl.

While the foregoing description and the accompanying figures and figures illustrate a preferred embodiment of the cooking vessel in accordance with the present invention, it should be appreciated that certain modifications could be made and are encouraged to be made in the materials and techniques of the disclosed embodiment without departing from the spirit and scope of the present invention as conveyed herein.

What is claimed is:

1. A cooking vessel comprising:
    a base having an interior surface including a lower portion configured to provide a main cooking surface;
    an upper portion on the interior surface, the upper portion being textured differently than the main cooking surface to retain food above the main cooking surface;
    a pistol-type handle, said handle comprising an elongate arm and a trigger, portions of said trigger separable from said arm to permit said handle to attach to said base, wherein said trigger may be brought into a position adjacent said arm to lock said handle to said base.

2. The cooking vessel of claim 1, wherein the food retention surface includes elongate recesses or grooves annularly located about the center of the vessel.

3. The cooking vessel of claim 1, wherein the food retention surface includes a pattern of elongate grooves aligned radially from the center of the interior of the vessel.

4. The cooking vessel of claim 1, wherein the textured surface includes dimples.

5. The cooking vessel of claim 1, wherein the textured surface has a higher coefficient of friction than the main cooking surface, the textured surface disposed above the main cooking surface.

6. The cooking vessel of claim 1, wherein the main cooking surface extends in a substantially horizontal direction, and the vessel further includes a handle having a gripping portion providing an axis that extends at an able with respect to the horizontal axis.

7. The cooking vessel of claim 6, wherein the angle between the axis of the handle and the horizontal surface is between about 30 degrees and 60 degrees.

8. A cooking vessel comprising:
    a base portion;
    at least two interchangeable handles, both of which are attachable to the cooking vessel, and one of which handles is an elongate, angled pistol-type gripping handle used while cooking in the cooking vessel, for shaking and flipping food ingredients in the cooking vessel while cooking, and the other handle is a serving handle that does not extend from the cooking vessel as far as the cooking handle and is used to facilitate serving of the cooked dish or carrying the cooking vessel before or after cooking, whereby the cooking handle and the serving handle are attachable and detachable from the same portion of the cooking vessel, wherein the cooking handle comprises a pistol-type gripping portion and a trigger, portions of the trigger separable from the pistol-type gripping portion to allow the handle to be attached to the vessel and movable toward the pistol-type gripping portion to lock the handle to the vessel.

9. The cooking vessel of claim 8, further comprising a predetermined attachment point at which the detachable handles can be attached and detached.

10. The cooking vessel of claim 9 further comprising, a permanent handle that is appropriate to facilitate serving with the serving handle, and is preferably situated opposite the attachment point for the detachable handles.

11. A wok comprising:
    a substantially bowl-shaped base having an interior surface including lower portion configured to provide a main cooking surface;
    a handle having gripping portion having an axis and gripping surface, the gripping portion extending at an angle with respect to a horizontal surface of the base to provide a pistol style gripping portion, wherein the handle comprises a pin, a pistol grip member, and a grip member, the grip member rotatable about the pin between an open position away from said pistol grip portion and a closed position in abutting relation with said pistol grip portion, to facilitate attachment of said handle to said base; and
    an upper portion on an interior surface of the wok having a textured surface configured to retain food above the main cooking surface.

12. A cooking vessel comprising:
    a base portion;
    at least two interchangeable handles, both of which are attachable to the cooking vessel, and one of which handles is an elongate, gripping handle used while cooking in the cooking vessel, for shaking and flipping food ingredients in the cooking vessel while cooking, and the other handle is a serving handle that does not extend from the cooking vessel as far as the cooking handle and is used to facilitate serving of the cooked dish or carrying the cooking vessel before or after cooking, whereby the cooking handle and the serving handle are attachable and detachable from the same portion of the cooking vessel and both handles include a safety release to prevent inadvertent release of the handle, the safety release including a release device that cooperates with an interior handle lock;
    wherein the elongate gripping handle further comprises an additional interior handle lock that cooperates with grip device on the handle that moves between an engaged and disengaged position.

13. The cooking vessel of claim 12, wherein said base further comprises an interior surface having a lower portion configured to provide a main cooking surface and an upper portion textured differently than said lower portion to retain food above the main cooking surface.

14. The cooking vessel of claim 13, further including elongate recesses or grooves annularly located about the center of the vessel at least in the upper portion.

* * * * *

UNITED STATES PATENT AND TRADEMARK OFFICE
CERTIFICATE OF CORRECTION

| | | |
|---|---|---|
| PATENT NO. | : 7,165,489 B1 | |
| APPLICATION NO. | : 10/643329 | |
| DATED | : January 23, 2007 | |
| INVENTOR(S) | : Juan Fernandez and Anthony Notaro | |

It is certified that error appears in the above-identified patent and that said Letters Patent is hereby corrected as shown below:

Title Page, (57) ABSTRACT, Line 4, insert --of-- after "interior".

Col. 1, Line 52, "casserole style" should read --casserole-style--.

Col. 2, Line 1, insert --which-- after "wok".

Col. 2, Line 38, insert --a-- after "includes".

Col. 2, Line 44, "build up" should read --build-up--.

Col. 4, Line 3, delete --,-- after "released".

Col. 4, Line 7, "a" should read --an--.

Col. 4, Line 7, delete --of-- after "view".

Col. 4, Line 11, "a" should read --an--.

Col. 4, Line 55, insert --,-- after "17".

Col. 7, Line 1, delete --,-- after "projections".

Col. 7, Line 40, "able" should read --angle--.

Col. 8, Line 1, insert --being-- before "separable".

UNITED STATES PATENT AND TRADEMARK OFFICE
CERTIFICATE OF CORRECTION

PATENT NO. : 7,165,489 B1
APPLICATION NO. : 10/643329
DATED : January 23, 2007
INVENTOR(S) : Juan Fernandez and Anthony Notaro It is certified that error appears in the above-identified patent and that said Letters Patent is hereby corrected as shown below:

Col. 8, Line 8, delete --,-- after "comprising".

Col. 8, Line 14, insert --a-- after "including".

Col. 8, Line 16, insert --a-- after "having".

Col. 8, Line 19, "pistol style" should read --pistol-style--.

Signed and Sealed this

First Day of January, 2008

JON W. DUDAS
*Director of the United States Patent and Trademark Office*